No. 663,693. Patented Dec. 11, 1900.
F. W. BROOKS.
SEAL.
(Application filed Oct. 2, 1900.)
(No Model.)
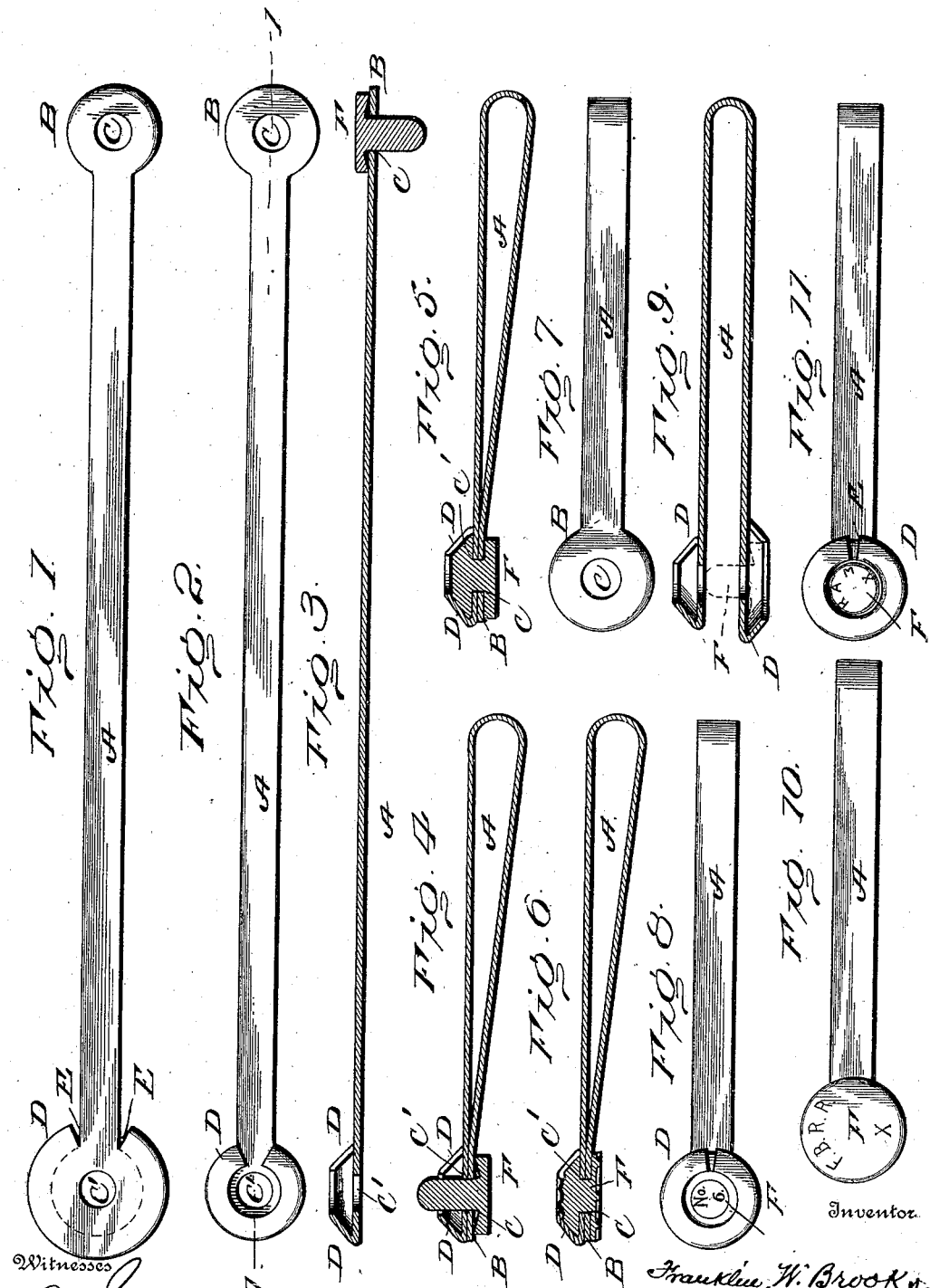

UNITED STATES PATENT OFFICE.

FRANKLIN W. BROOKS, OF WASHINGTON, DISTRICT OF COLUMBIA, ASSIGNOR TO THE GRANT MANUFACTURING COMPANY, OF VIRGINIA.

SEAL.

SPECIFICATION forming part of Letters Patent No. 663,693, dated December 11, 1900.

Application filed October 2, 1900. Serial No. 31,737. (No model.)

*To all whom it may concern:*

Be it known that I, FRANKLIN W. BROOKS, a citizen of the United States, residing at Washington, in the District of Columbia, have invented certain new and useful Improvements in Seals; and I do hereby declare the following to be a full, clear, and exact description of the invention, such as will enable others skilled in the art to which it appertains to make and use the same.

My invention relates to certain new and useful improvements in metallic seals, and particularly to that class in which the shackle is composed of a thin strip of sheet metal joined at the ends by a soft-metal rivet.

My invention has for its object to so construct the sheet-metal strip at or near its ends that when said ends are confined by the compression of the soft-metal rivet the greatest amount of security will be effected and any effort to open the seal will be rendered not only difficult, but readily exposed and a restoration of normal conditions prevented.

With this end in view my invention consists of a sheet-metal seal having a shackle provided at each end with an opening to receive a soft-metal rivet and one or both of said openings surrounded by a collar the free edge of which extends beyond the plane of the rivet-hole and is adapted to receive and confine to a limited extent the circumferential portion of the compressed and expanded soft-metal rivet and at the same time leave exposed a sufficient portion of the central area thereof to receive any desired impression made by a sealing-press.

In order that those skilled in the art to which my invention appertains may make and use the same, I will proceed to describe the construction and manner of using the improved seal, referring by letters to the accompanying drawings, in which—

Figure 1 is a plan view of the sheet-metal strip adapted to be formed with a collar at one end only. Fig. 2 is a similar view of the same after the collar has been formed at one end. Fig. 3 is a central longitudinal section taken on the line I I of Fig. 2 and with the soft-metal rivet secured in position in one end of the metal strip. Fig. 4 is a similar section to that shown at Fig. 3, but with the metal strip bent to form a shackle and with the stem of the soft-metal rivet passed through the opposite end of the strip and in position to be compressed. Fig. 5 is a view similar to Fig. 4 and showing the stem of the soft-metal rivet and the head also partially compressed and the body of the stem radially expanded within the collar. Fig. 6 is a similar view and showing the soft-metal rivet completely compressed and the free edge of the collar turned down into the surface of the soft-metal rivet. Fig. 7 is a plan view of the form shown at Fig. 5 and of the under side with the rivet removed. Fig. 8 is a plan view of the seal in the condition shown at Fig. 6. Fig. 9 is a central longitudinal section of the sheet-metal strip or shackle, showing a modification of the construction and in which each end of the strip is formed with a collar. Fig. 10 is a plan view similar to Fig. 8, but showing the reverse side; and Fig. 11 is a plan view of the construction shown at Fig. 9 and with the soft-metal rivet compressed to lock the two ends of the shackle permanently.

Similar parts are represented by like letters of reference in the several figures of the drawings.

A represents a shackle composed of a strip of sheet metal, such as tin, which may be of any design in its longitudinal direction. It is extended radially at one end, as indicated at B, to provide sufficient area for a hole or opening C. The opposite end is also extended laterally, as shown at D, and to a greater extent than shown at B and kerfed or cut, as seen at E, in order that the material embraced between the outer circumference of D and the dotted concentric line may be turned up, as shown at Figs. 2 and 3, to constitute a wall or collar, the base of said collar located, as shown, concentric with the circumference of the opening C' and at a predetermined distance therefrom, as clearly shown.

F is a rivet composed of lead or other equivalent soft metal and formed with a head and shank or stem, as best shown at Figs. 3 and 4. I prefer to make the head thicker at its periphery than at the plane of juncture with the stem for the purpose presently explained. The soft-metal rivet is located in the hole or opening C in the end B and secured therein in any suitable manner, so that the improved seals may be packed and transported and be ready for use in the condition shown at Fig. 3.

In using my improved seal the strip A is passed through the staple or other device to be secured and the shank of the rivet F is passed through the opening and collar D at the opposite end of the strip A, as shown at Fig. 4, and the rivet compressed by the ordinary seal-press. The first result of the compression is to crush or compress the rivet axially and expand the shank portion laterally, as shown at Fig. 5, so that it is confined within the wall of the collar. The completion of the compressing action still further crushes and expands the head and shank of the rivet, makes the necessary impressions upon one or both sides of the disk-faces, and at the same time turns the edge of the wall or collar down into the crushed and expanded shank portion of the rivet, as clearly shown at Figs. 6 and 8, thus rendering it impossible to separate or unlock the ends of the strip or shackle A without mutilating the seal to such an extent as to readily expose the attempt and to such a degree as to render it impossible to restore it to a semblance of its original condition after action by the sealing-press.

The rivet, as shown at Figs. 3 and 4, has the head made thicker at its periphery, as stated, and this construction enables the stem to be readily projected an additional distance through the opposite end of the sheet-metal strip to furnish a proper amount of metal for expansion within the collar D and at the same time provides a slight excess of metal at the periphery of the head for lateral or radial expansion to create a sufficiently extensive area to receive the characters impressed by the die of the press. Instead of forming one end only of the strip A with a collar D, as described, both ends may be similarly constructed and as shown most clearly at Fig. 9. When both ends are thus constructed, the collar at the end to which the rivet is initially attached should be of sufficient diameter to receive the head of the rivet, as indicated in dotted lines in Fig. 9. The presence of the collar in either construction shown conceals and protects the edge of the soft-metal rivet or lock, and hence it cannot be compressed radially to re-form the shank, and thus enable one end of the strip to be drawn apart from the other, as may readily be done in the absence of the collar.

In the single construction shown at Fig. 6 the soft metal exposed within the edge of the collar need not be for purposes of security impressed with any characters, although, if thought desirable, it may be done, as shown at Fig. 8.

The head of the rivet constitutes the surface upon which is impressed the designating characters, as shown at Fig. 10, and owing to the expanded condition of the same and the presence of the characters thereon it is obvious that any effort to contract the soft metal sufficiently for the opening C of the strip to pass over it will result in the absolute defacement of the characters and manifesting the attempt.

From what has been said it will be seen that with the construction shown at Fig. 3 ample protection is provided for; but I have shown the construction illustrated at Fig. 9 simply to indicate that the security may, if so desired, be augmented by the duplication of the collars D.

As will be seen, particularly by reference to Figs. 1 and 2, I am enabled to make the collar integral with the strip A by providing the additional area of metal included between the dotted lines and the outside boundary and making the kerf or cut E and then turning up the collar portion D into the position shown at Figs. 2 and 3.

In turning up the collar I prefer to give it the inclination shown at Figs. 3 and 4 in order that its movement into the position shown at Fig. 6 may be readily effected by the action of the sealing-press. It will be obvious that the collars D may be made separate from the strip A and secured in place with solder or otherwise.

I am aware that it is not new, broadly, to secure the ends of a sheet-metal strip together by means of a soft-metal rivet and do not therefore wish to be understood as making claim to such construction broadly.

What I claim as new, and desire to secure by Letters Patent, is—

1. An improved seal comprising a flexible sheet-metal shackle provided at each end with a hole or passage-way, an exterior wall or collar surrounding the hole or passage-way a predetermined distance therefrom and with its free edge extended above the plane of the hole or passage-way and adapted to be bent inwardly, and a soft-metal rivet adapted to have its periphery when compressed confined within the collar and its central area exposed substantially as set forth.

2. In a seal, the shackle composed of flexible sheet metal provided at each end with a rivet-hole or passage-way surrounded by a collar having its free edge extended beyond the plane of the hole or passage-way, and adapted to confine and partially conceal a soft-metal rivet, substantially as and for the purpose set forth.

3. In a seal of the character described, the sheet-metal strip or shackle formed with passage-ways at each end and a surrounding collar having its wall inclined inwardly, as and for the purpose set forth.

In testimony whereof I affix my signature in presence of two witnesses.

FRANKLIN W. BROOKS.

Witnesses:
WM. C. MCINTIRE,
J. C. ANDERSON.